(12) United States Patent
Cirulli et al.

(10) Patent No.: US 7,454,369 B2
(45) Date of Patent: Nov. 18, 2008

(54) SYNCHRONOUS ELECTRONIC REQUISITION PROCESSING METHODS

(75) Inventors: Susan B. Cirulli, Simpsonville, SC (US); Nitin Jhingan, Endwell, NY (US); Andrew Kofkee, Endicott, NY (US); James Oswald, Castle Creek, NY (US)

(73) Assignee: International Business Machines Corporation, Armonk, NY (US)

( * ) Notice: Subject to any disclaimer, the term of this patent is extended or adjusted under 35 U.S.C. 154(b) by 505 days.

(21) Appl. No.: 10/687,718

(22) Filed: Oct. 17, 2003

(65) Prior Publication Data

US 2005/0086122 A1    Apr. 21, 2005

(51) Int. Cl.
*G06F 17/30* (2006.01)
*G06Q 30/00* (2006.01)

(52) U.S. Cl. .................. 705/26; 705/1; 705/27
(58) Field of Classification Search ........... 705/26–27, 705/1, 10
See application file for complete search history.

(56) References Cited

U.S. PATENT DOCUMENTS

| | | | | |
|---|---|---|---|---|
| 5,315,504 A | * | 5/1994 | Lemble | 700/90 |
| 5,666,493 A | | 9/1997 | Wojcik et al. | |
| 5,758,327 A | | 5/1998 | Gardner et al. | |
| 5,825,880 A | * | 10/1998 | Sudia et al. | 713/180 |
| 5,870,717 A | * | 2/1999 | Wiecha | 705/26 |
| 5,870,745 A | * | 2/1999 | McCune | 707/10 |
| 5,890,137 A | | 3/1999 | Koreeda | |
| 6,101,485 A | | 8/2000 | Fortenberry et al. | |
| 6,209,091 B1 | * | 3/2001 | Sudia et al. | 713/175 |
| 6,286,028 B1 | | 9/2001 | Cohen et al. | |
| 6,460,020 B1 | | 10/2002 | Pool et al. | |
| 6,647,373 B1 | * | 11/2003 | Carlton-Foss | 705/37 |
| 6,721,921 B1 | * | 4/2004 | Altman | 715/512 |
| 7,117,165 B1 | * | 10/2006 | Adams et al. | 705/26 |
| 2002/0007324 A1 | * | 1/2002 | Centner et al. | 705/26 |
| 2002/0013898 A1 | * | 1/2002 | Sudia et al. | 713/155 |
| 2002/0184255 A1 | * | 12/2002 | Edd et al. | 707/500 |

OTHER PUBLICATIONS

"oh to Launch Online Managed StaffingExchange with SAP". PR Newswire. New York: Jun. 23, 2003. p. 1. [discovered via Dialog Search, accessed via Proquest Jun. 25, 2008].*

* cited by examiner

*Primary Examiner*—Jeffrey A. Smith
*Assistant Examiner*—William J. Allen
(74) *Attorney, Agent, or Firm*—Scully, Scott, Murphy & Presser, P.C.; William H. Steinberg, Esq.

(57) ABSTRACT

An electronic requisition processing method and system are disclosed. The method comprises the steps of preparing an electronic requisition including a requisition proposal; establishing an electronic list of approvers for the requisition; and at defined times, electronically recalculating the list. Preferably, this list is recalculated after each of at least some of the approvers act on the requisition; and the list is recalculated according to a given set of rules. Also, in the preferred system, the approval process is synchronous, whereby upon submission of the requisition, the requisition is immediately available for approval. Additionally, preferably, when each approver approves, the list is dynamically recalculated to take into account the availability of approvers further down in the list.

2 Claims, 2 Drawing Sheets

Current RCW Flow

SYNCHRONOUS ELECTRONIC REQUISITION PROCESSING METHODS

BACKGROUND OF THE INVENTION

1. Field of the Invention

This invention generally relates to electronic shopping; and more specifically, the invention relates to an approval process in an electronic requisitioning system.

2. Background Art

With the growth of the Internet and electronic commerce, businesses are beginning to use electronic requisitioning systems. In these systems, a person who wants to make a purchase on behalf of the business prepares an electronic purchase order, obtains the appropriate approval within the business, and then electronically sends the order to a supplier.

It is believed that current electronic requisition systems can be improved. For instance, it is believed that the amount of time needed to complete the approval process can be shortened. To elaborate, with current systems, several factors contribute to the length of time needed for the approval process. First, there may be a delay between the submission of a request and the time the request is available to the first approver. Also, when the approval of multiple approvers is needed, the approvers may act in series, one after another. This can result in lengthy delays before all the approvals are obtained, especially if one of the approvers is not available for several days or longer. Moreover, current systems are designed primarily for use in one language, and this tends to limit the geographic scope of the system.

SUMMARY OF THE INVENTION

An object of this invention is to provide an improved electronic requisitioning system.

Another object of the invention is to provide an electronic requisitioning system in which the approval process is synchronous, whereby the requisition is available for approval immediately upon submission.

A further object of the present invention is to provide an electronic requisitioning system including an approval list that is dynamically recalculated to take into account the availability of approvers.

Another object of the invention is to provide an Internet based electronic requisitioning system that automatically converts currencies as a requisition is transmitted from one country to another.

These and other objectives are attained with an electronic requisition processing method and system. The method comprises the steps of preparing an electronic requisition form including a proposal for a requisition; establishing an electronic list of approvers for the requisition; and at defined times, electronically recalculating the list. Preferably, this list is recalculated after each of at least some of the approvers act on the requisition proposal; and, when recalculated, the list is recalculated according to a given set of rules.

Also, in the preferred system, the approval process is synchronous, whereby upon submission of the requisition, the requisition is immediately available for approval by the first approver. Additionally, preferably, when each approver approves, the approver list is dynamically recalculated to take into account the current availability of approvers further down in the list.

Further benefits and advantages of the invention will become apparent from a consideration of the following detailed description, given with reference to the accompanying drawings, which specify and show preferred embodiments of the invention.

DETAILED DESCRIPTION OF THE PREFERRED EMBODIMENT

Figure 1:
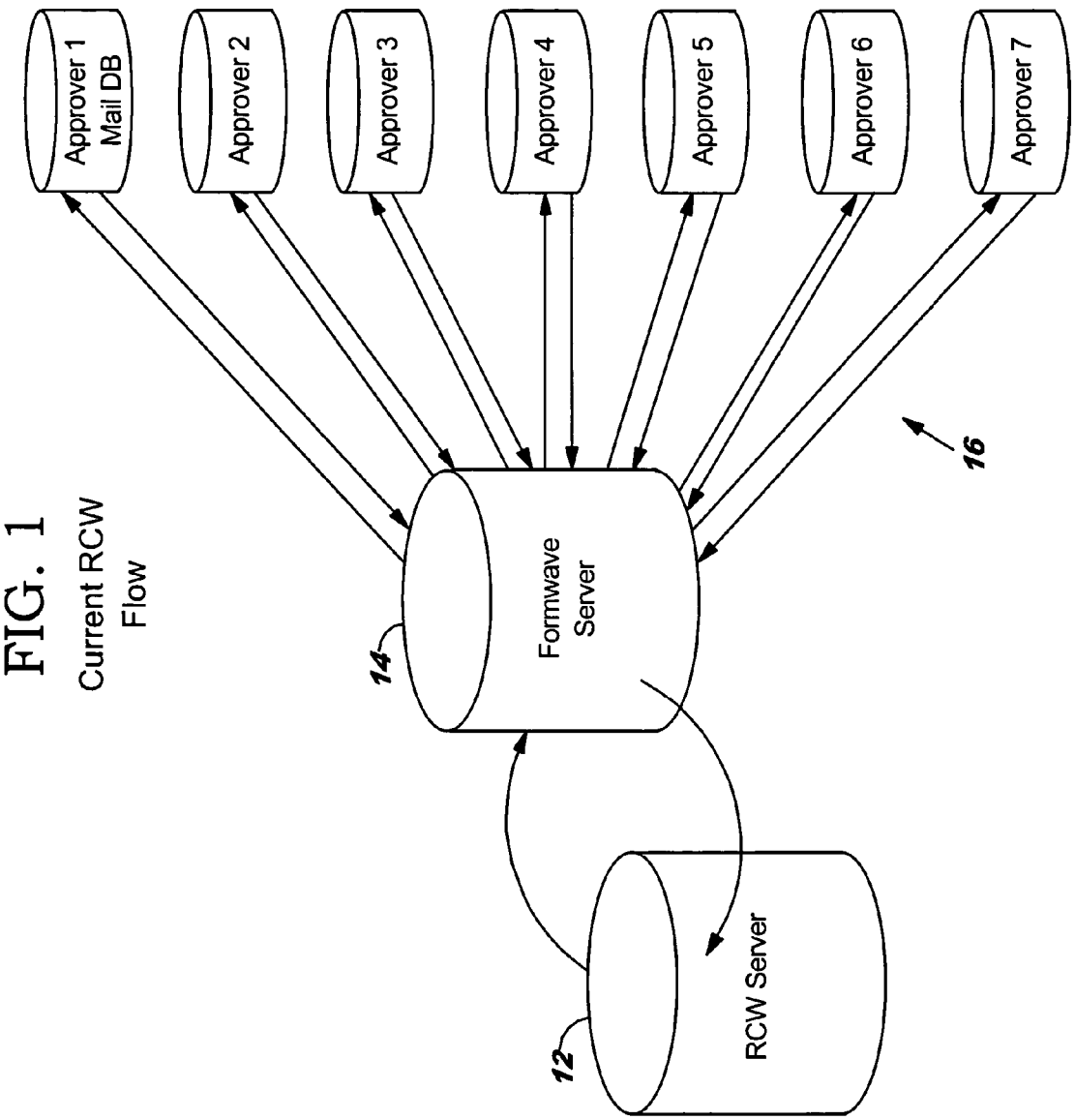
FIG. 1 shows a current requisition approval process.

FIG. 1 shows a current requisition approval flow that can be implemented using a software application referred to as Flowmark, which is a trademark of The International Business Machines Corporation. To start the process of FIG. 1, a user, represented at 2, submits a requisition, which is sent to server 14. Within half an hour, a bridge/batch job is used to assign approvers 16 and to send the approval list/summary of the requisition to the application for processing. An Email is sent to the requester.

The requisitioning application receives data from a database, referred to as ReqCat, which provides a summary of requisition and approver list. The application processes this data and sends approval notices to each approver via, for example, an application referred to as NotesMail. Each approver approves/rejects the requisition in their mail database. The act of approving/rejecting sends an email back to the application server, telling it to send the next approver a notice, or to stop the process.

Once all approvers have approved the requisition, or one approver has rejected, the application sends what is known as a "finished package" back to ReqCat. This data package contains the information about which approvers approved/rejected, their comments, and any changes they may have made to the requisition, like accounting changes.

Within a half hour of receipt, ReqCat, using a bridge/batch job, processes the finished package sent from the application, either approving or rejecting the requisition, and updating any data elements the approver may have updated. The requester and initiator receive an email notification informing them of the status of the requisition.

Figure 2:
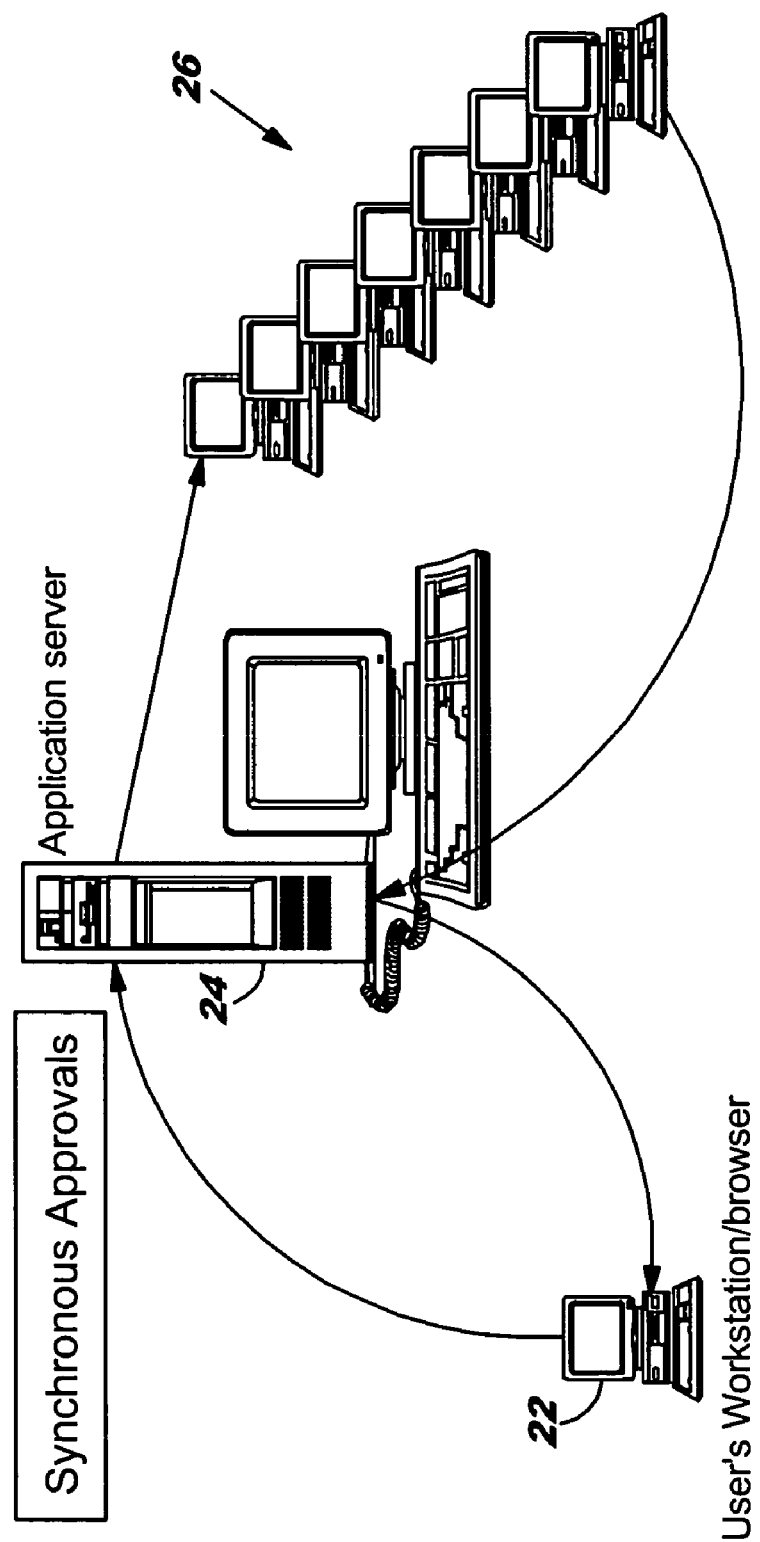
FIG. 2 illustrates a requisition approval process embodying the present invention.

FIG. 2 illustrates a requisition approval process in accordance with a preferred embodiment of this invention. In this procedure, a user, represented at 22, completes the requisition, and meanwhile, approvers, represented at 24, have been, or are, assigned. The user then submits the requisition; and an application server 26 processes the request and notifies the first approver via email that a requisition awaits their approval.

Each approver clicks on a link in the email notification she/he received, and logs onto the application server via their web browser. Preferably there is a link directly to the requisition and to a view of the requisitions awaiting their approval.

If the approver went directly to the requisition or opened it, the approver may click "Approve" or "Reject" and enter any comments. Certain approvers can edit fields of the requisition. If the approver is using the view of requisitions requiring their approval, they can select multiple requisitions from this view and click "approve" or "reject" and are brought to another screen that allows them to enter a single comment and "apply to all" or enter an individual comment for each and click "continue."

When an approver approves a requisition and if there is another approver who needs to approve, then the act of the first approver approving the requisition sends the email to the second approver who needs to approve. Also, requesters/initiators are notified of the approval/rejection via email when the request is fully approved or rejected.

Preferably, at any time during the approval cycle, the user can log onto the application server and check the approval status of the requisition, via a "Show Approvers" option, to see which approvers have not yet approved. In addition, a requester/initiator may cancel a requisition that is awaiting approval, which sends an email to all the approvers who are aware of the requisition, informing them it has been cancelled, and the approval process stops.

Also, in this procedure, when each approver approves a requisition, the approval list is recalculated, which takes into account any delegates or new approver names that are further down in the list from the current approver. This feature is referred to as "dynamic approval calculation." After an approval, an email is sent to the next approver. Approvers can approve multiple requisitions from a view of requisitions awaiting approval, or they can drill into the requisition and open it to examiner it and approve it. All approvers can enter comments, and some types of approvers can edit properties of the requisition.

Preferably, all actions are real-time—that is, there is no delay between submission and the first approver having access to the requisition to approve it, nor is there any delay from when one approver approves and the next approver becomes the pending approver. This provides the user who submitted the requisition with a universal place—the requisitioning application—to see which approvers have approved and which approvers are yet to approve.

Notices, referred to as nag notices, may be sent to pending approvers who have exceeded a configurable time limit for approvals. In addition, in the preferred embodiment of the invention, an approver may reside anywhere in a defined geographic area or region. For example, if Canada and the U.S. are in the same defined geographic region, a Canadian approver could approve requisitions submitted by a United States user.

As indicated above, users and approvers, and different approvers, may be in different countries or regions that use different currencies. Because of this, preferably, the requisitioning system automatically converts currencies as a requisition is transmitted from one country to another. In this way, the approvers see prices and costs in their local currencies.

The preferred embodiment of the invention, as described above in detail, provides a number of important features. One significant feature, for instance, is the dynamic approval re-calculation. With this feature, the approver list is recalculated each time an approver approves a requisition. This may be done, for example, to account for someone who delegated approval for a period of time, but resumes that authority at the end of that time period. With approval recalculation, the proper approver can be pulled back onto the list.

Also, in an embodiment of the invention that has been actually reduced to practice, the core approval logic was split into two different java frameworks. The majority of the application is in a framework referred to as EAD4J (Enterprise Application Development Framework for Java). A significant portion of the application, which does the work of approval assignment, is built in SQLJ, in a DB2 stored procedure.

This mix of technology allows for optimum performance in a historically slow-performing area; the DB2 stored procedure allows for queries to be bound directly to the database so they can be executed as quickly as possible, which is not an option when executing queries via the EAD4J framework.

While it is apparent that the invention herein disclosed is well calculated to fulfill the objects stated above, it will be appreciated that numerous modifications and embodiments may be devised by those skilled in the art, and it is intended that the appended claims cover all such modifications and embodiments as fall within the true spirit and scope of the present invention.

The invention claimed is:

1. A synchronous electronic requisition processing method, comprising the computer implemented steps of:
   a user preparing an electronic requisition form including a proposal for a requisition, said proposal requiring approval by each of a plurality of approvers, wherein the preparing step further includes the step of the user submitting the proposal, whereby, in response to the submission, the proposal is immediately available for approval;
   establishing an electronic list of the approvers for said proposal;
   an approver delegating approval authority to a delegate for a period of time and resuming approval authority a the end of the period of time;
   at least some of said approvers approving said proposal, and in response to at least some of said approvers approving the proposal, dynamically recalculating the list to take into account the current availability of the approvers further down on the list, wherein, the step of dynamically recalculating the list of approvers further includes the steps of:
   taking into account any delegates that are further down in the list from the current approver when the approver delegating approval authority has not resumed approval authority; and
   pulling the name of the approver delegating approval authority back onto the list when the approver delegating approval authority has resumed authority;
   the method further comprising steps of:
   providing each of the approvers with a view of the proposal;
   a first approver approving the proposal, and the act of the first approver approving the proposal sending an email to a second of the approvers;
   the user checking to see which approvers have approved the proposal; and
   the user canceling the proposal, said canceling sending an email to all of the approvers informing the approvers that the proposal has been canceled.

2. A synchronous electronic requisition processing method, comprising the computer implemented steps of:
   a user preparing an electronic requisition form including a proposal for a requisition, wherein said proposal requires approval by each of a plurality of approvers;
   establishing an electronic list of the approvers for the proposal for the requisition; and
   at least one of the approvers delegating approval authority to a delegate for a period of time and resuming approval authority at the end of said period of time;
   each time at least some of said approvers approves the proposal, dynamically recalculating the list to take into account the current availability of the approvers further down on the list
   wherein, the step of dynamically recalculating the list of approvers includes the steps of;
   determining that the at least one of the approvers delegating approval authority has resumed authority; and in response to determining that the at least one of the approvers delegating approval authority has resumed authority, pulling the name of the approver delegating approval authority back onto the list;

the method further comprising the steps of:

making the proposal immediately available for approval upon submission by the user;

providing each of the approvers with a view of the proposal;

at least one of the approvers editing properties of the proposal;

a first approver approving the proposal, and the act of the first approver approving the proposal sending an email to a second of the approvers;

the user checking to see which approvers have approved the proposal; and the user canceling the proposal, said canceling sending an email to all of the approvers informing the approvers that the proposal has been canceled.

* * * * *